(12) United States Patent
Lachance et al.

(10) Patent No.: US 10,017,124 B2
(45) Date of Patent: Jul. 10, 2018

(54) RACK SYSTEM WITH PIVOTING RAIL

(71) Applicant: TECHNO-FAB 9000 INC., Saint-Hyacinthe (CA)

(72) Inventors: Yan Lachance, Saint-Simon-de-Bagot (CA); Guillaume Audet, Shefford (CA)

(73) Assignee: TECHNO-FAB 9000 INC., Saint-Hyacinthe, QC (CA)

( * ) Notice: Subject to any disclaimer, the term of this patent is extended or adjusted under 35 U.S.C. 154(b) by 0 days.

(21) Appl. No.: 15/440,754

(22) Filed: Feb. 23, 2017

(65) Prior Publication Data

US 2017/0240118 A1   Aug. 24, 2017

Related U.S. Application Data

(60) Provisional application No. 62/298,880, filed on Feb. 23, 2016.

(51) Int. Cl.
*B60R 9/042* (2006.01)
*B60P 3/10* (2006.01)
*B60R 9/04* (2006.01)

(52) U.S. Cl.
CPC .......... *B60R 9/0423* (2013.01); *B60P 3/1025* (2013.01); *B60R 9/04* (2013.01)

(58) Field of Classification Search
CPC ......... B60R 9/0423; B60R 9/042; E06C 5/02; B60P 3/1025; B60P 3/06; B60P 3/10
See application file for complete search history.

(56) References Cited

U.S. PATENT DOCUMENTS

| 2,442,363 | A | * | 6/1948 | Jones | E05F 17/00 49/82.1 |
| 2,478,044 | A | * | 8/1949 | Gargiulo | E06L 33/50 49/252 |

(Continued)

FOREIGN PATENT DOCUMENTS

| FR | 2680736 A1 | * | 3/1993 | ........... B60R 9/0423 |
| WO | WO-2015051409 A1 | * | 4/2015 | ............... E06C 5/04 |

OTHER PUBLICATIONS

Extended European Search Report from 17157721.6 filed Feb. 23, 2017; Berlin; dated Jul. 4, 2017; Schaeffler, C.

*Primary Examiner* — Gregory W Adams
(74) *Attorney, Agent, or Firm* — Benoit & Cote; France Cote (57) ABSTRACT

There is described a rack system for displacing a ladder between a loading/unloading position and a stored position respectively on a side and on a rooftop of the vehicle. The ladder rack system comprises a handle lever by which a user applies an input angular movement. A gear assembly is connected to the handle lever and comprises gears to multiply the input angular movement into an output angular movement greater than the input angular movement. A linking member is pivotably connected to the gear assembly and is for undergoing and transmitting the output angular movement. A sliding arm assembly is to receive the output angular movement from the linking member, thereby being pivoted between the loading/unloading position in which the sliding arm assembly extends substantially vertically on the side of the vehicle and the stored position in which the sliding arm assembly extends substantially parallel to the rooftop.

13 Claims, 9 Drawing Sheets

(56) References Cited

U.S. PATENT DOCUMENTS

| | | | | |
|---|---|---|---|---|
| 3,013,681 | A * | 12/1961 | Garnett | B60P 3/14 |
| | | | | 280/4 |
| 5,398,778 | A * | 3/1995 | Sexton | B60R 9/0423 |
| | | | | 182/127 |
| 6,315,181 | B1 * | 11/2001 | Bradley | B60R 9/0423 |
| | | | | 224/310 |
| 7,097,407 | B2 * | 8/2006 | Kurohori | B62H 3/00 |
| | | | | 296/37.6 |
| 7,097,409 | B2 * | 8/2006 | Richter | B60R 9/0423 |
| | | | | 182/127 |
| 9,132,781 | B2 | 9/2015 | Thibault | |
| 2002/0090285 | A1 | 7/2002 | Levi | |
| 2006/0185933 | A1 * | 8/2006 | Thibault | B60R 9/0423 |
| | | | | 182/127 |
| 2007/0183875 | A1 * | 8/2007 | Thibault | B60R 9/0423 |
| | | | | 414/462 |
| 2009/0065301 | A1 * | 3/2009 | Ellement | B60R 3/02 |
| | | | | 182/127 |
| 2011/0290428 | A1 * | 12/2011 | Roussel | B60B 30/06 |
| | | | | 157/1.22 |
| 2014/0030054 | A1 * | 1/2014 | Levi | B60R 9/0485 |
| | | | | 414/809 |

* cited by examiner

PRIOR ART

FIGURE 1

PRIOR ART

FIGURE 2

PRIOR ART

FIGURE 3

PRIOR ART

RACK SYSTEM WITH PIVOTING RAIL

CROSS-REFERENCE TO RELATED APPLICATIONS

This application claims benefit or priority from provisional U.S. patent application 62/298,880, filed Feb. 23, 2016, the specification of which is hereby incorporated herein by reference in its entirety.

BACKGROUND

Field

The subject matter disclosed generally relates to rack systems. More specifically, it relates to a rack system for a ladder.

Related Prior Art

There exist rack systems for loading and unloading a ladder on/from the roof of a vehicle. However, when in the unloading position, such racks are limited with regards to the distance from the ground at which the ladder can be lowered, when extending on the side of the vehicle.

When one wants to load a ladder with such a system, the top portion of the ladder is first hooked on the front hook. The bottom portion of the ladder is then elevated from the ground, and hooked on the rear hook of the back pivoting mechanism. With a handle, the pivoting mechanism is operated such that the ladder moves from the side of the vehicle up to the roof. As one can understand, when such a rack system is in the loading position on the side of the vehicle, the higher the rear pivoting mechanism is, the harder it will be to raise the bottom portion of the ladder up to rear hook.

In U.S. Pat. No. 9,132,781, issued to Thibault, there is illustrated a prior art rack system having a handle 78 and a rod 80 by which the user can apply a force to move down or up the pivoting rail assembly. Substantial effort from the user is required. There is thus a need for a rack in which the effort that a user needs to give is reduced.

Furthermore, the system described therein does not allow the pivoting rail assembly to move down low enough to allow a comfortable loading/unloading of the ladder on the pivoting rail. There is therefore a need for a rail assembly that can reach a lower position for improved comfort when performing loading or unloading actions.

SUMMARY

According to an aspect of the invention, there is provided a rack system for displacing a ladder between a loading/unloading position on a side of a vehicle and a stored position on a rooftop of the vehicle. The ladder rack system comprises a handle lever by which a user applies an input angular movement. There is provided a gear assembly comprising gears to multiply the input angular movement into an output angular movement greater than the input angular movement, and a linking member, which is pivotably connected to the gear assembly, for undergoing and transmitting the output angular movement. A sliding arm assembly is provided to receive the output angular movement from the linking member, thereby being pivoted between the loading/unloading position in which the sliding arm assembly extends substantially vertically or at an angle on the side of the vehicle and the stored position in which the sliding arm assembly extends substantially parallel to the rooftop.

According to an embodiment, the sliding arm assembly comprises a small arm hingedly connected to the linking member and a bigger arm slidably connected to the small arm.

According to an embodiment, there is further provided a sliding mechanism fixed and pivotable with respect to the vehicle, the sliding mechanism being slidably connected to the small arm.

According to an embodiment, the sliding mechanism rotates about a fixed pivot that is fixed with respect to the vehicle.

According to an embodiment, the sliding mechanism slides within the small arm as the linking member undergoes the output angular movement.

According to an embodiment, the bigger arm is slidably connected to the small arm by a rail.

According to an embodiment, the rail further comprises a belt holding a weight of the bigger arm.

According to an embodiment, the belt is attached to the sliding mechanism to allow the bigger arm to slide with respect to the small arm as the linking member undergoes the output angular movement.

According to an embodiment, there is further provided a lifting aid which retains at least partially a weight of the bigger arm as the sliding arm assembly is closer to the loading/unloading position.

According to an embodiment, the lifting aid is a spring assembly.

According to an embodiment, the spring assembly is connected to the linking member tensioned as the linking member undergoes the output angular movement.

According to an embodiment, the bigger arm comprises a retaining assembly for holding the ladder.

According to an embodiment, the gears to multiply the input angular movement are proportioned to provide a complete deployment of the ladder with the input angular movement between 60° and 90°.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In embodiments, there is disclosed a rack system 10 for loading and unloading a load on/from the roof of a vehicle and/or on/from a storing area. The load is usually a ladder, but can also be a step ladder or any substantially longitudinal load.

Since the load (i.e., the ladder) is usually cumbersome and heavy, a rack system to store the load on the vehicle (or on the sorting area) can be useful. The rack system should be easy to use and should be ergonomic, i.e., relatively comfortable to operate.

The embodiments described below are given by way of example only and the various characteristics and particularities thereof should not be considered as being limitative of the present invention. Unless otherwise indicated, positional descriptions such as "top", "bottom", "front", "rear" and the like should be taken in the context of the figures and should not be considered as being limitative.

Also, while the ladder rack system shown in the Figures is placed on the roof of the vehicle, it can be considered to affix the ladder rack system on one of the top sides of the vehicle.

It is to be noted that the vehicle may include a vehicle having wheels which includes or not an engine. For example, the vehicle may be a truck, a car, a trailer and the like such as to receive a ladder rack system 10 on its rooftop or on at least part of its rooftop. It should also be noted that a "side" of the vehicle may refer to any side thereof, e.g., right side, left side, rear side, front side, etc.

Figure 1:
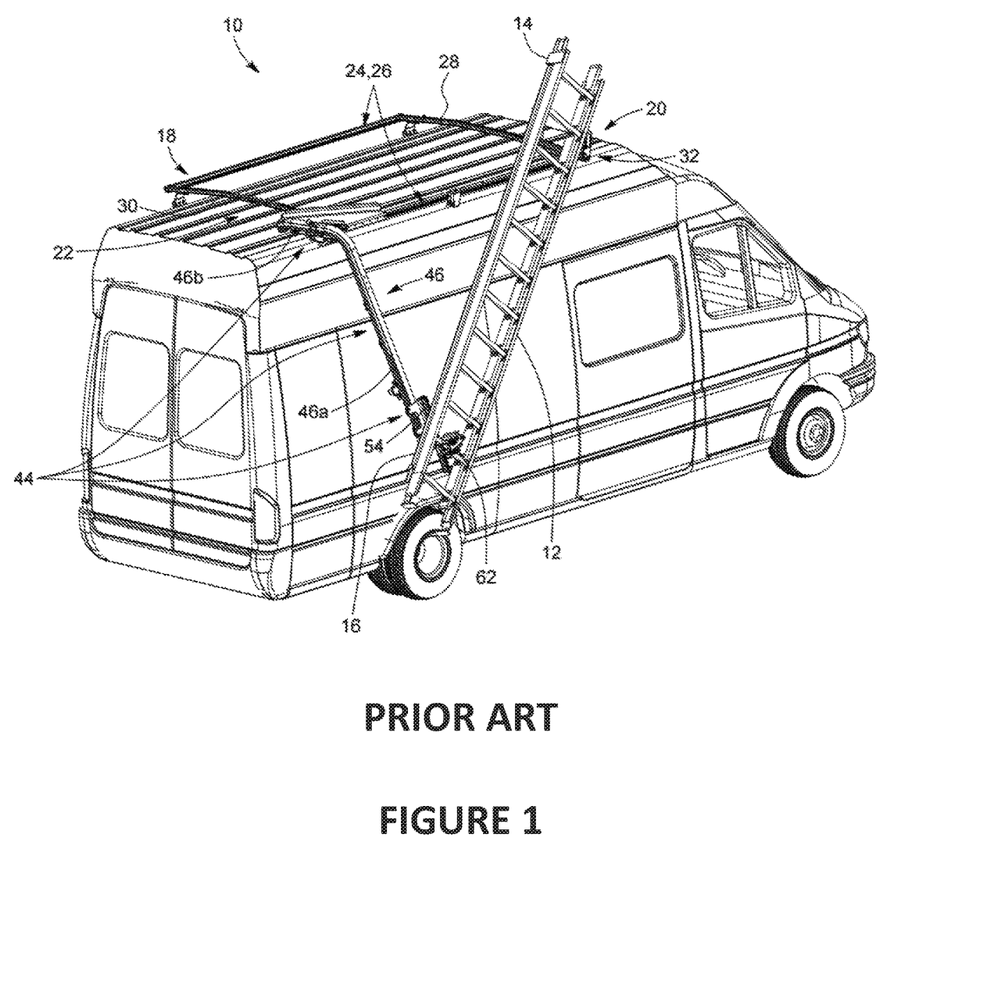
FIG. 1 is a perspective view illustrating a rack system with a pivoting rail according to the prior art.
Figure 2:
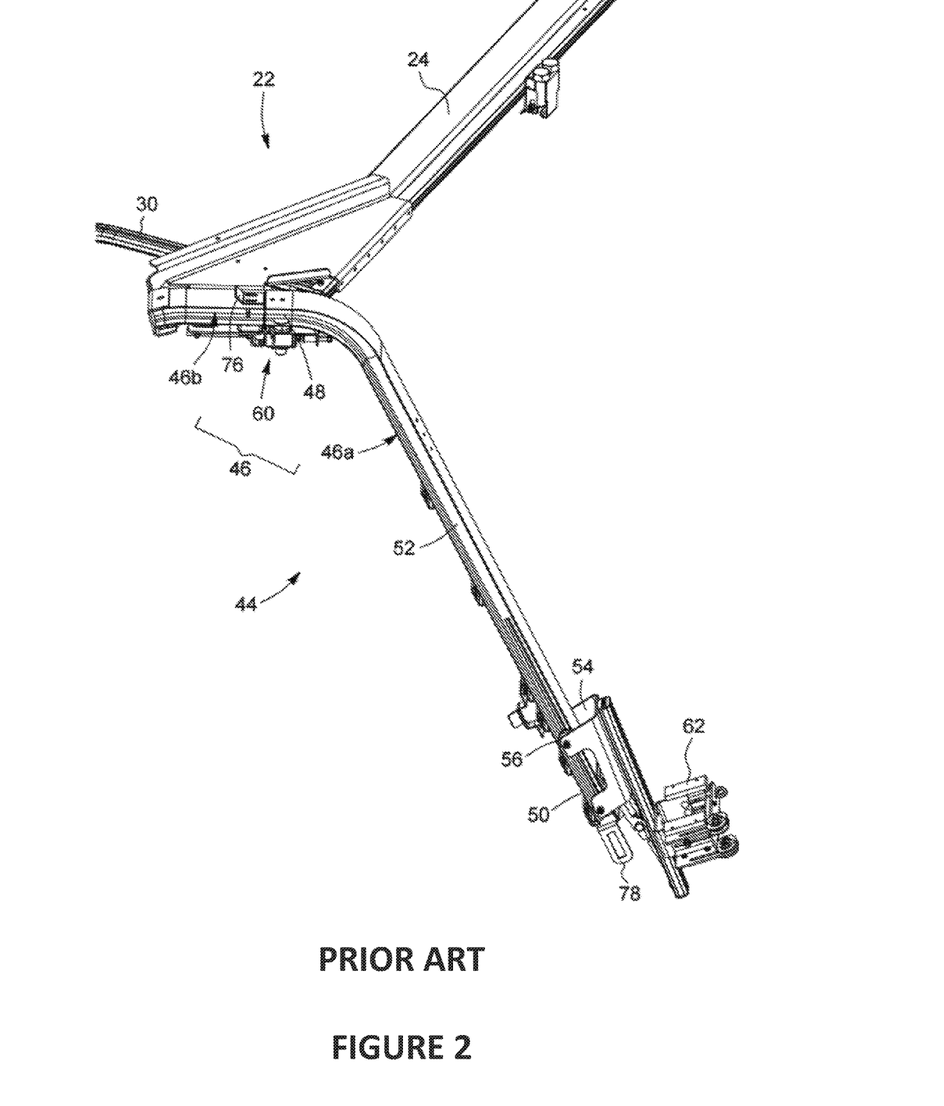
FIG. 2 is a perspective view illustrating a pivoting rail with a handle, according to the prior art.

Referring to FIG. 1, a prior art ladder rack system 10' installed on a vehicle is shown. In FIGS. 1 and 2, the prior art ladder rack system 10' is shown in a deployed or a loading/unloading position, the ladder 12 extending on a side of the vehicle. In FIGS. 3-6, the prior art ladder rack system 10' is shown in a stored position, with the ladder 12 retained on the roof of the vehicle.

Still referring to FIG. 1, the prior art ladder rack system 10' includes a frame 18 mounted on the roof of the vehicle. The frame 18 has a front section 20 located close to the front of the vehicle and a rear section 22 located at the rear of the vehicle. The frame 18 includes right and left longitudinal frame members 24, 26 extending on the right and left side of the vehicle, respectively. The frame 18 also includes front and rear transverse frame members 28, 30 extending transversally at the front and rear side of the roof of the vehicle, respectively.

The prior art ladder rack system 10' also includes first and second assemblies 32, 44. In the embodiment illustrated, the first assembly 32 is a front ladder retaining assembly 32 connected to the front section 20 of the frame 18. The front ladder retaining assembly 32 is for retaining a first end 14 of the ladder 12, which generally corresponds to the top end of the ladder 12.

The second assembly 44 of the prior art ladder rack system 10' is connected to the rear section 22 of the frame 18, and is for retaining the second end 16 (or bottom end) of the ladder 12. The assembly 44 includes a pivoting rail 46 and a carriage 54 adapted to slide on the pivoting rail 46. The carriage 54 is provided with a retaining assembly 62 for receiving the second end 16 of the ladder 12, and in this case to secure one of the ladder rungs therein. The pivoting rail 46 includes a pivotable portion 46a and a fixed portion 46b. The fixed portion 46b is attached to the rear section 22 of the frame 18. The pivotable portion 46a can pivot relative to the fixed portion 46b, but it can be considered to have the pivotable portion 46a pivot relative to the frame 18, as long as the pivotable and fixed portions 46a, 46b can be placed in alignment with one another, in the loading/unloading position.

The carriage 54 of the prior art ladder rack system 10' is provided with a retaining assembly 62. In the present case, the retaining assembly 62 comprises a U-shape plate and a hinged locking plate, for securing a ladder step therein. Of course, other types of retaining assembly 62 can be considered, such as for example a system of hooks, similar to the front ladder retaining assembly 32.

However, the retaining assembly 62 does not reach a substantially low enough position, i.e., it is still high enough to require the user to actually lift up the ladder (or other type of load) to install the lowermost part of the ladder, i.e., the second end 16 on the retaining assembly 62. This step requires substantial effort from the user, which is uncomfortable, and may result in occupational injuries to the musculoskeletal system.

Figure 3:
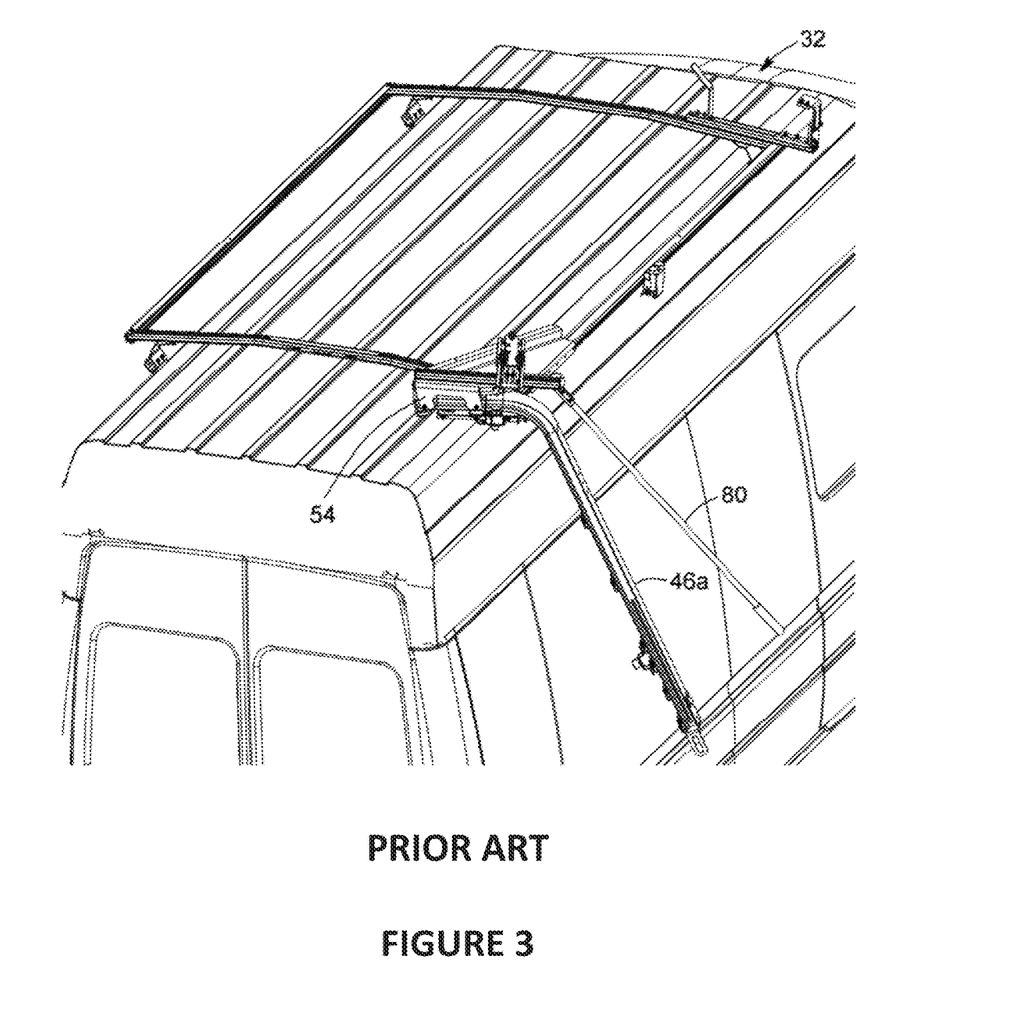
FIG. 3 is a perspective view illustrating a pivoting rail with a rod, in a loading/unloading position, according to the prior art.
Figure 4:
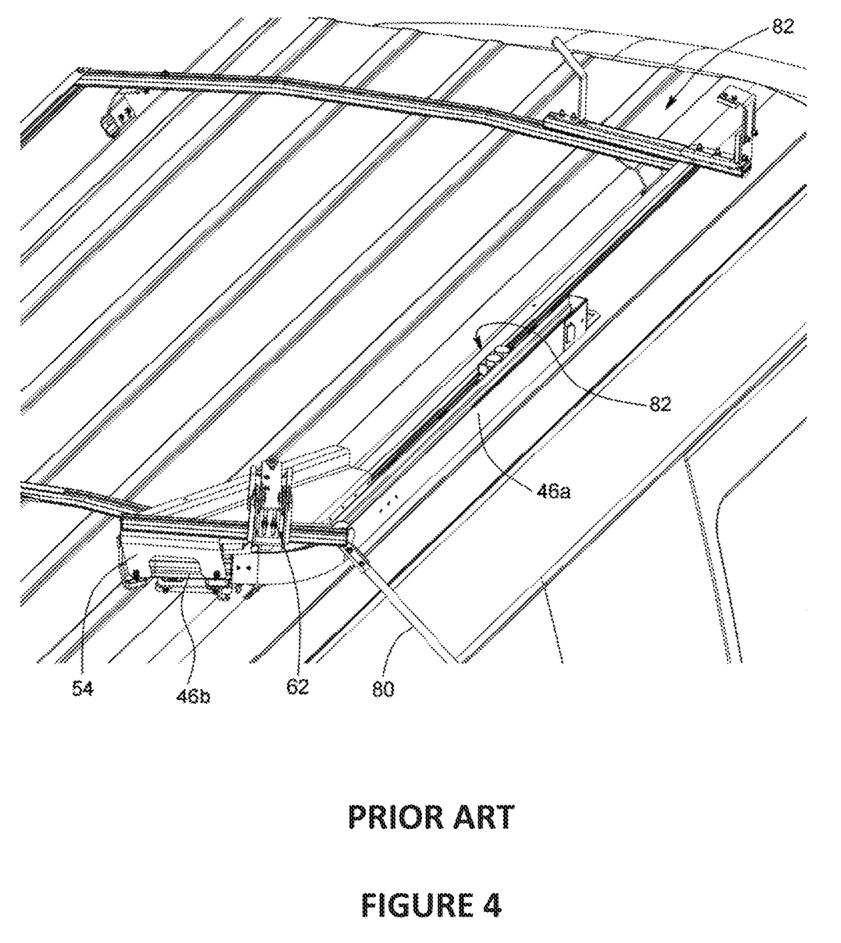
FIG. 4 is a perspective view illustrating a pivoting rail with a rod, in a stored position, according to the prior art.

FIGS. 2-4 illustrate the prior art ladder rack system 10' with a mechanism for user interaction with the pivoting rail 46. In FIG. 2, there is shown a handle 78 at a lower end of the pivoting rail 46, adjacent the retaining assembly 62. This handle 78 allows a user to grab the pivotable portion 46a and move it down or up to bring the pivoting rail 46 in loading/unloading position or stored position, respectively. However, if the pivoting rail 46 is in the stored position on the rooftop of the vehicle, the user must be tall enough to reach the handle 78.

FIGS. 3-4 show an additional means for user interaction in the prior art rack system 10', i.e., a rod 80. The rod 80 is useful if the person cannot reach the handle 78 when the pivoting rail 46 is in the stored position on the rooftop of the vehicle. However, the rod 80 does not reduce the effort required to lift the pivoting rail 46 with the ladder 12 installed thereon.

In all cases described above in reference with the prior art rack system 10', the user is expected to provide a substantial effort to bring the pivoting rail 46 in the loading/unloading position or in the stored position.

FIGS. 5-9 illustrate embodiments of a rack system 10 which address the issues mentioned above in reference with the prior art system shown in FIGS. 1-4. In order to facilitate the use of the rack system during loading and unloading operations, the rack system 10 described herein comprises a gear assembly 40 that reduces both the force and the required amplitude of movement expected from the user. The gear assembly 40, fixed relative to the frame 18 and connected with other moving parts described below, ensures a smooth operation of the rack system 10 for loading and unloading. The addition of a lifting aid ensures that the force to be applied remains reasonable.

The rack system 10 comprises a frame 18 installed on a rooftop of a vehicle, substantially as described in reference with FIG. 1, and a retaining assembly.

The rack system 10 comprises a sliding arm assembly 120 that is movable (both in rotation and translation) and that supports the ladder 12. The movement of the sliding arm assembly 120 is dictated by a linking member 130 pivotally connected to the gear assembly 40. More specifically, the linking member 130 is an arm that can pivot around the pivot of gear 42, i.e., it rotates with gear 42. The linking member 130 cannot move except for this pivoting movement.

The sliding arm assembly 120 comprises two members which are slidably connected therebetween, namely the small arm 124 and bigger arm 122. The small arm 124 is hingedly connected to the linking member 130 via a hinge or joint 126, such as a knuckle attachment. The location of the joint 126 on the linking member 130 is preferably at an end thereof, distally from the gear 42, which is the pivot of the linking member. The small arm 124 is further slidably attached to a fixed pivot 60, shown in FIG. 5. The fixed pivot 60 is fixed relative to the frame 18 or to the vehicle. The fixed pivot 60 is pivotally connected to a sliding mechanism 66. The sliding mechanism 66, translationally fixed, can nonetheless pivot around the fixed pivot 60 and is slidably connected to the small arm 124 of the sliding arm assembly 120. The slidable connection is provided by a rail 64, or any other suitable equivalent that is complementary to the sliding mechanism 66, under the small arm 124. The fact that the sliding mechanism 66 is pivotally connected to the fixed pivot 60 and slidably connected to the small arm 124 implies that the small arm 124 can both pivot and slide with respect to the fixed pivot 60, providing both rotation and translation movements to the sliding arm assembly 120.

Figure 9:
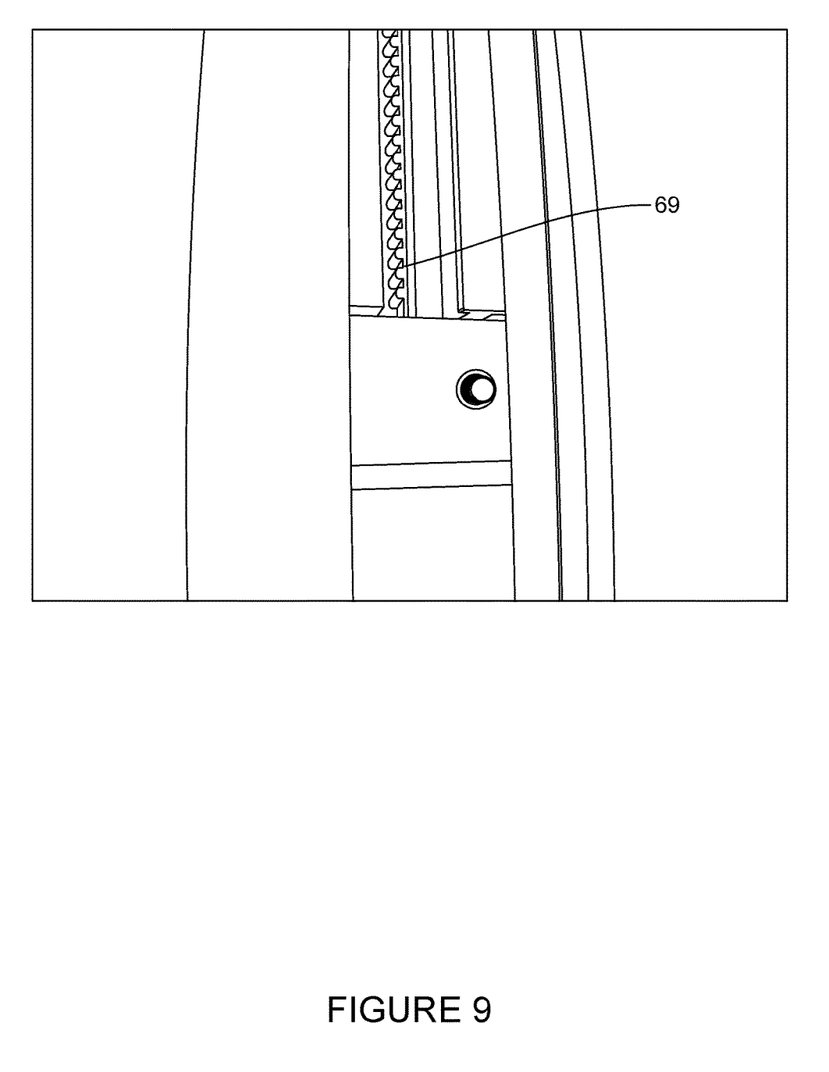
FIG. 9 is a picture of a belt under the small arm, according to an embodiment.

According to an embodiment, the sliding mechanism 66 is further connected to a belt 69, shown in FIG. 9. The belt 69 makes the link with the upper portion of the bigger arm 122 to ensure translation thereof with respect to the small arm 124 (i.e., the sliding between both arms). According to an embodiment, the belt 69 is made of fiber-reinforced rubber (e.g., reinforced with carbon fiber or glass fiber) and is substantially rigid.

To operate the rack system 10 in order to move down or move up the sliding arm assembly 120, a handle lever 50 is provided and is eventually connected to the gear assembly 40. The handle lever 50 extends downwardly enough to reach a height that is convenient for the user, who can manipulate the handle lever 50. Although it is shown as straight, the handle lever 50 can have a curve to aid the user in its manipulation.

Figure 5:
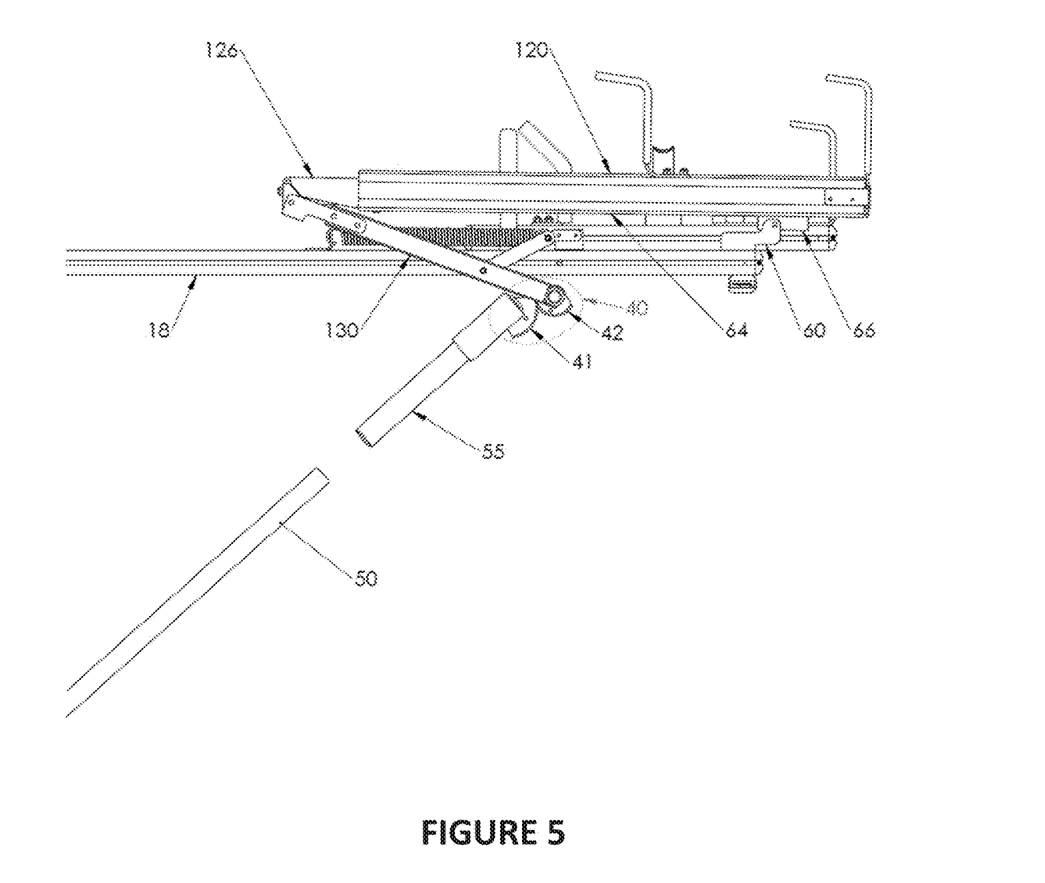
FIG. 5 is a side view of the rack system in a retracted position, according to an embodiment.
Figure 6:
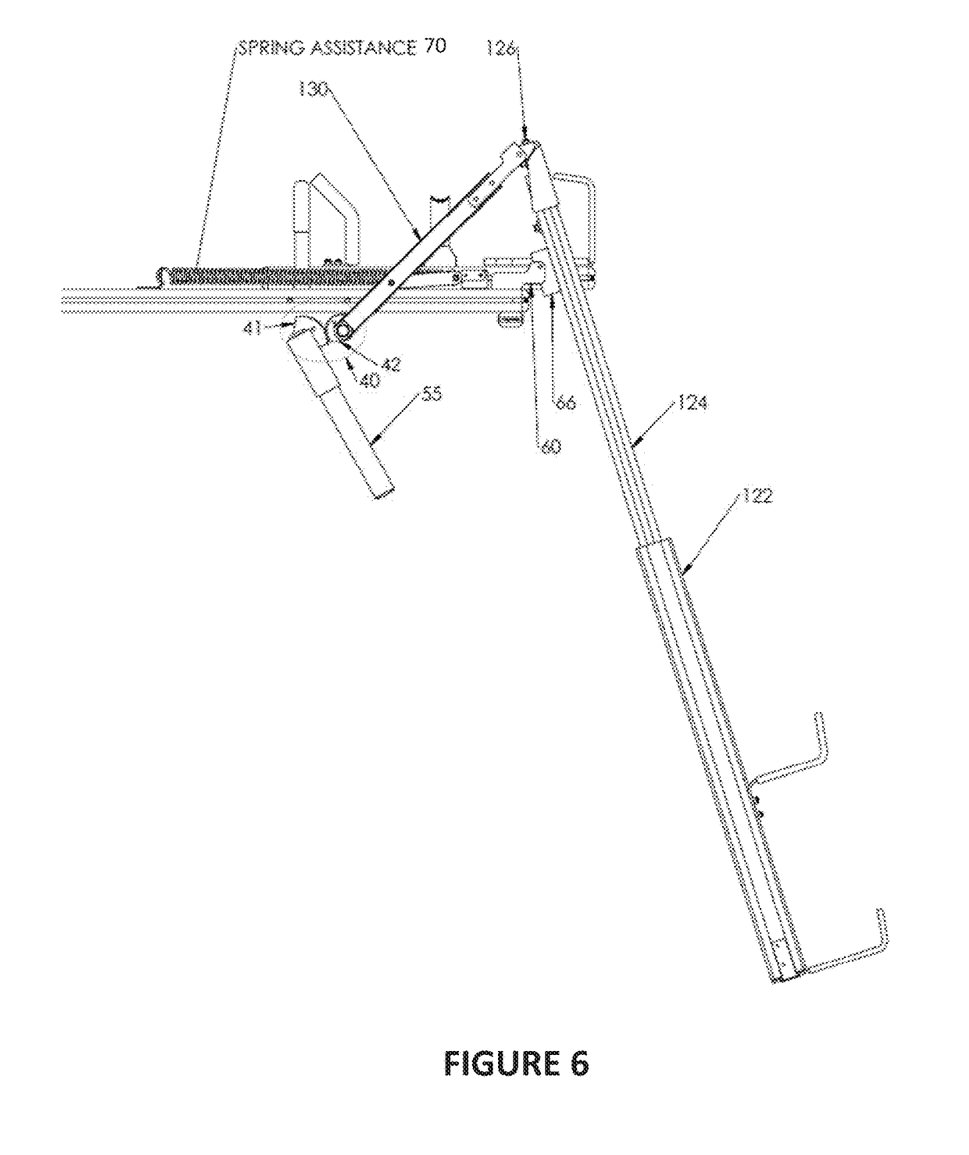
FIG. 6 is a side view of the rack system of FIG. 5 in a deployed position.
Figure 7:
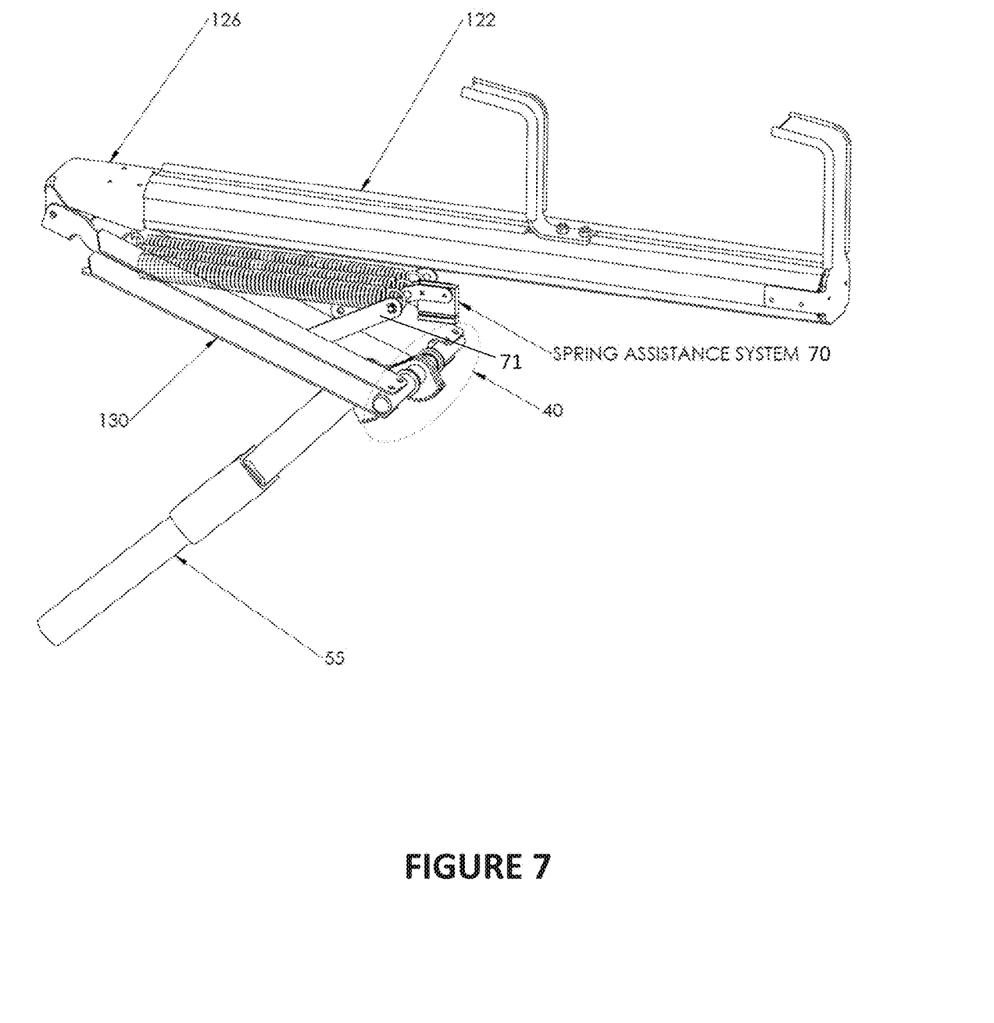
FIG. 7 is a perspective view of the sliding arm assembly in a retracted position, according to an embodiment.
Figure 8:
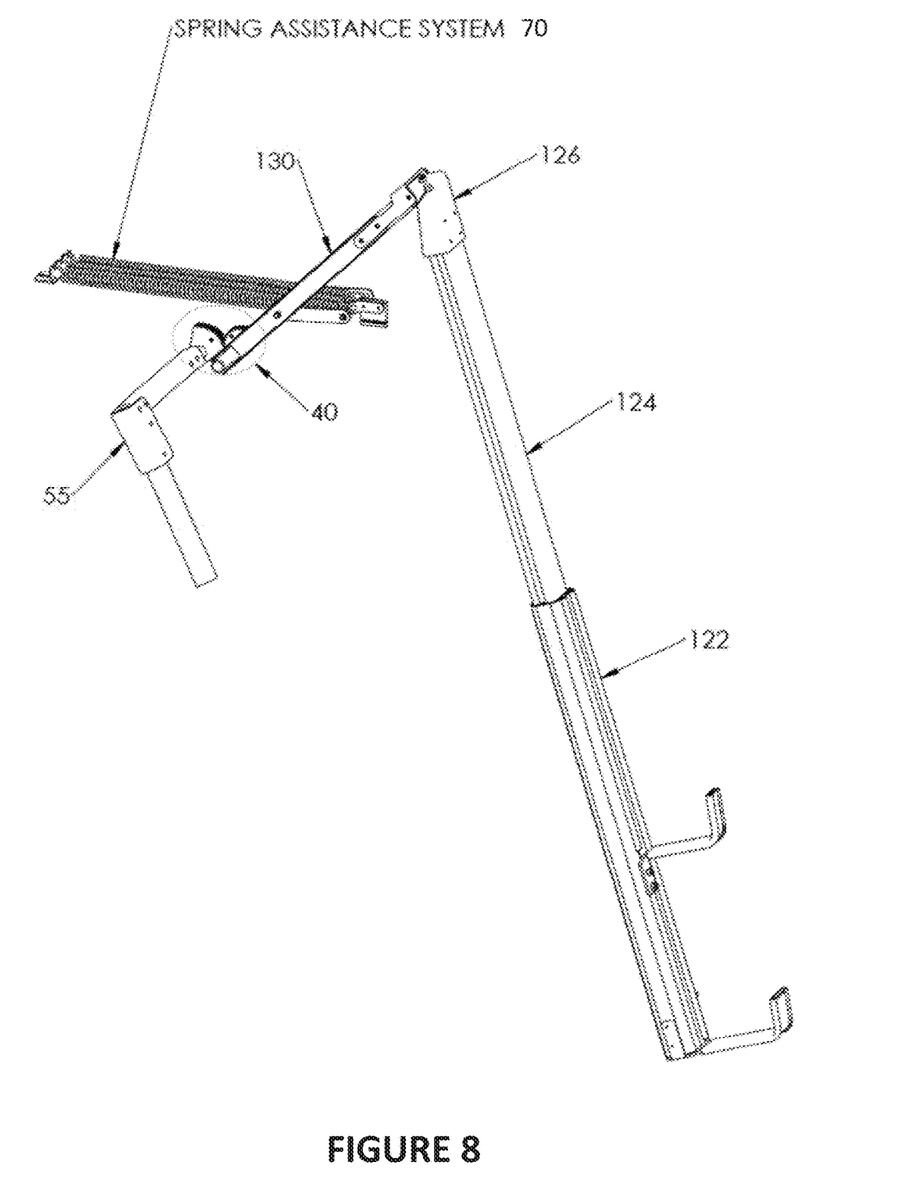
FIG. 8 is a perspective view of the sliding arm assembly of FIG. 7 in a deployed position.

According to an exemplary embodiment shown in FIG. 5, the handle lever 50 is connected to the gear assembly 40 via a handle receptacle 55. In this embodiment, the handle lever 50 is a rod, and the handle receptacle 55 is a hollow tube having a lumen that can accommodate the handle lever 50, which is thus slidably engaged therein. Alternatively, the handle lever 50 can be provided as a tube and the handle receptacle 55 as a rod accommodated in the handle lever 50. A connector, such as a pin-hole assembly, can be provided to have both parts remain together. Other types of connection are also possible. It is also possible to operate the handle without any connector, with the handle lever being temporarily fitted into the handle receptacle for operation thereof. Alternatively, a plurality of such connectors can be provided so that the user can select which one will be used, thereby making the overall length of the handle lever 50 and the handle receptacle 55 adjustable. Having the handle lever 50 removable is convenient since it can be removed when the sliding arm assembly 120 is not being used (e.g., when the vehicle is on the road). The presence of the handle receptacle 55 only is less cumbersome than it is when the handle lever 50 is in place. According to an embodiment, the handle lever 50 can additionally be used as a key to unlock the system when the handle lever 50 is inserted into the handle receptacle 55.

The gear assembly 40 comprises gears 42, 41 to transmit and multiply the angular displacement of the handle lever 50 to a linking member 130. The handle lever is directly connected to the gear 41 (or indirectly connected thereto via the handle receptacle 55, as mentioned above) and can pivot around it. The linking member 130 is directly connected to the gear 42 and can pivot around it.

According to an embodiment, the gears 42, 41 in the gear assembly 40 are toothed wheels, as shown in FIG. 5. If the teeth spacing on both gears 42, 41 are the same, the multiplication of the angular displacement is the ratio of the radius of gear 41 over the radius of gear 42. Therefore, in order to provide an effective multiplication (ratio >1) of the angular displacement of the linking member 130 with respect to the handle lever 50, the gear 41 needs to have a radius larger than the radius of the gear 42. This multiplication is advantageous in that it reduces the angular movement that needs to be applied by the user on the handle lever 50.

Therefore, the handle lever 50 is used to apply an input angular movement on the first gear 41. The combination of the first gear 41 and second gear 42 (i.e., the gear assembly 40) multiplies the input angular movement, resulting in an output angular movement greater than the input angular movement, which is applied to the linking member 130. The linking member 130 pivots on one end and pushes on the small arm 124 with its other end. The small arm 124 is also slidably connected to the fixed, pivotable sliding mechanism 66, which makes the small arm 124 both pivot toward the vertical while staying close to the side of the vehicle (i.e., it moves toward the loading/unloading position). This change of angle results in the bigger arm 122, slidably connected to the small arm 124, to slide downwardly under the effect of its own weight.

However, a corollary of that multiplication is that the torque transmitted to the linking member 130 is reduced by the same ratio as the multiplication ratio of the angular movement. Retaining the bigger arm 122 or loading a heavy ladder may thus require a torque that is substantially higher than expected. To remedy to this decrease in torque transmission, a lifting aid is provided.

As shown in FIGS. 5-8, the lifting aid is embodied as a spring assembly 70. The non-supported weight of the bigger arm 122, which becomes more significant as the bigger arm is brought closer to the vertical, is at least partially supported by the lifting aid. According to an embodiment, the spring assembly 70 is connected to the linking member 130 with cams 71. As the sliding arm assembly 120 is deployed, the linking member 130 pulls the springs and the springs get tensioned, thereby storing energy. The energy associated with this movement (i.e., the mechanical work of the weight) is thus at least partially absorbed by the spring assembly 70, which can be a tension spring. This mechanism ensures that the user does not need to exert an excessive torque on the handle lever 50 when moving down the sliding arm assembly 120 to retain the weight of the bigger arm 122. The same applies for the reverse movement: when moving up the sliding arm assembly 120, the user does not need to exert an excessive torque on the handle lever 50 in the other way since the spring assembly 70 restitutes the energy it formerly absorbed to aid in lifting the bigger arm which is being brought closer to the horizontal (i.e., while its non-supported weight becomes less significant).

The rack system 10 described herein above provides several advantages over existing systems. Among others, only one movement (i.e., a rotation of the handle) needs to be performed by the user to load or unload the ladder. This direct drive for the rack system thus reduces and simplifies the actions expected from the user.

Moreover, the rack system described herein does not necessitate any pneumatic or hydraulic cylinder. Such equipment is prone to failure, especially in cold weather. Avoiding using them is thus particularly advantageous.

The gear system described above, which multiplies the angular movement of the handle, ensures that the amplitude of the movement required from the user on the handle stays small. According to an embodiment, when the ladder is fully unloaded, the angle of rotation of the handle stays below 120°, preferably between 60° and 90°, instead of a less advantageous angle of 140°-160° of the prior art. The gears 41, 42 should have their radius or teeth proportioned to provide a ratio allowing the desired output angular movement while having the input angular movement within this advantageous range (i.e., between 60° and 90°). This is advantageous from a safety perspective: the manipulation of the handle thus not require that the handle extends away from the vehicle outside the vehicle width. The handle can thus be manipulated on a road side or within a lane on a road without extending over an adjacent lane. Moreover, when the user manipulates the handle, the user moves in the same direction as the ladder. This is advantageous since when the ladder is being deployed, the user can see at all times where the ladder is being deployed to avoid contacting any object that could be in the way of the ladder being deployed. Accidents during the ladder deployment are therefore prevented.

Furthermore, the lift assistance, which partly supports the weight of the ladder, reduces risks of injury during drop-down and rise-up actions. The fact that the sliding arm assembly 120 reaches a lower height than existing systems also allows for a more ergonomic operation which also reduces risks of musculoskeletal injury, since the ladder will be extended downwardly at a sufficiently low height.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A rack system for displacing a ladder between a loading/unloading position on a side of a vehicle and a stored position on a rooftop of the vehicle, the ladder rack system comprising:
    a handle lever by which a user applies an input angular movement;
    a gear assembly connected to the handle lever and comprising gears to multiply the input angular movement into an output angular movement greater than the input angular movement;
    a linking member, which is pivotably connected to the gear assembly, for undergoing and transmitting the output angular movement;
    a sliding arm assembly to receive the output angular movement from the linking member, thereby being pivoted between the loading/unloading position in which the sliding arm assembly extends substantially vertically or at an angle on the side of the vehicle and the stored position in which the sliding arm assembly extends substantially parallel to the rooftop.

2. The rack system of claim 1, wherein the sliding arm assembly comprises a small arm hingedly connected to the linking member and a bigger arm slidably connected to the small arm.

3. The rack system of claim 1, further comprising a sliding mechanism translationally fixed and pivotable with respect to the vehicle, the sliding mechanism being slidably connected to the small arm.

4. The rack system of claim 3, wherein the sliding mechanism rotates about a fixed pivot that is fixed with respect to the vehicle.

5. The rack system of claim 4, wherein the sliding mechanism slides within the small arm as the linking member undergoes the output angular movement.

6. The rack system of claim 5, wherein the bigger arm is slidably connected to the small arm by a rail.

7. The rack system of claim 6, wherein the rail further comprises a belt holding a weight of the bigger arm.

8. The rack system of claim 7, wherein the belt is attached to the sliding mechanism to allow the bigger arm to slide with respect to the small arm as the linking member undergoes the output angular movement.

9. The rack system of claim 2, further comprising a lifting aid which retains at least partially a weight of the bigger arm as the sliding arm assembly is closer to the loading/unloading position.

10. The rack system of claim 9, wherein the lifting aid is a spring assembly.

11. The rack system of claim 10, wherein the spring assembly is connected to the linking member tensioned as the linking member undergoes the output angular movement.

12. The rack system of claim 2, wherein the bigger arm comprises a retaining assembly for holding the ladder.

13. The rack system of claim 1, wherein the gears to multiply the input angular movement are proportioned to provide a complete deployment of the ladder with the input angular movement between 60° and 90°.

* * * * *